United States Patent Office 3,405,208
Patented Oct. 8, 1968

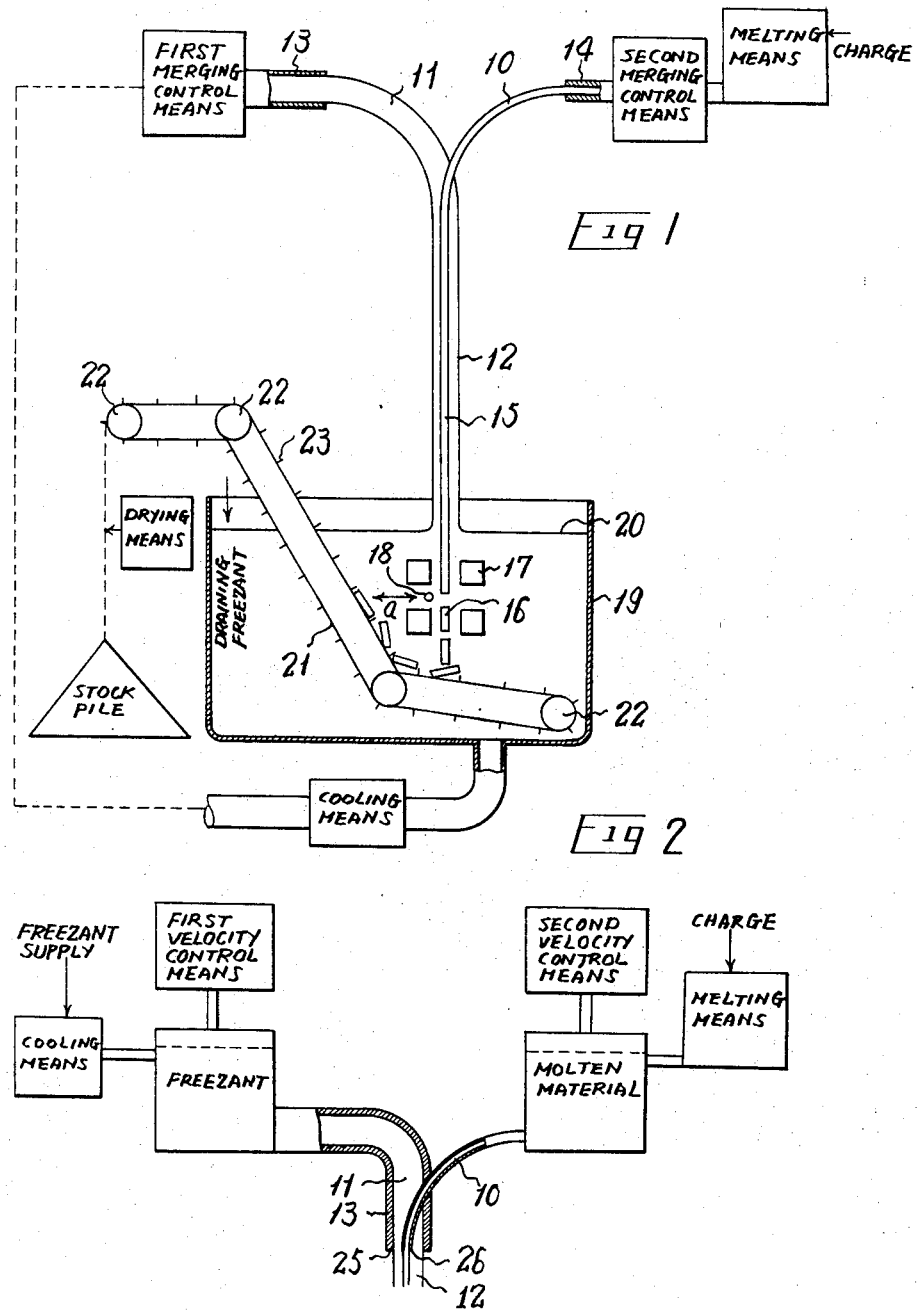

3,405,208
METHOD FOR GRANULATING MELTABLE MATERIAL
Shozo Kurata, 2421 Oomachi, Kamakuro, Kanagawa Prefecture, Japan
Continuation-in-part of abandoned application Ser. No. 444,120, Mar. 31, 1965. This application Dec. 12, 1966, Ser. No. 600,938
Claims priority, application Japan, Apr. 7, 1964, 39/19,631
4 Claims. (Cl. 264—144)

ABSTRACT OF THE DISCLOSURE

A process for granulating meltable material employing vertical streams of a molten material by gravity and of immiscible liquid freezant having a velocity equal to that of the stream of the molten material.

References to prior related applications

This is a continuation-in-part application of copending parent application Ser. No. 444,120 filed Mar. 31, 1965, now abandoned, and the priority dates to which the parent application is entitled are claimed for all subject matter common therewith.

The prior art

Paraffin wax is generally distributed in the form of thick plates or blocks. However, for many applications, granulated paraffin would be more desirable.

Summary of the invention

Therefore, the objects of the present invention are:

to provide a granulating method especially suited to give a superior granulation of paraffin and similar meltable materials;

to provide a granulating method for paraffin and similar meltable materials utilizing melting and subsequent freezing of the meltable material, said method yielding a superior product regardless of differences in the specific gravities of molten material and freezant;

to provide a granulating method for paraffin and similar meltable materials yielding granules having an elongated shape.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

Description of the drawings

FIG. 1 is one example of the process of the invention.
FIG. 2 is another example of the process of the invention.

Preferred embodiments of the invention

Briefly, the objects of the invention are achieved by merging liquid columns of freezant and molten material, freely falling at equal velocities; breaking the subsequently frozen column of molten material into elongated granules; and separating the granules from the freezant.

As applied herein, the term "freezant" is used analogously to the term "coolant" and refers to a cold liquid that solidifies molten material. A limitation on the freezant of the present invention is that it and the molten material must be immiscible.

FIG. 1 shows the merging of a falling stream 10 of molten pariffin with a falling stream 11 of freezant such as water into a unified stream 12. The water exits horizontally at 15° C. from pipe 13, while the paraffin exits horizontally at 80° C. from pipe 14. The pipes are at the same elevation. After the streams have left their respective pipes in a horizontal direction, their vertical component of velocity arises substantially due to gravitational acceleration. Since the streams are falling from the same elevation, physical principles show that the vertical velocities of the two streams are equal. Thus, when the two streams merge, as shown in FIG. 1, the relative velocity between the streams is zero. The freezant, depending on the particular conditions, encircles or adjoins the molten material and the two streams continue to flow downwards as a single stream.

After merging, the molten paraffin soon freezes into a solid column 15. This column is broken into elongated granules 16 by a conventional breaking means. The particular breaking means shown in FIG. 1 comprises four blocks 17 and a reciprocating rod 18. The directions of reciprocation are shown by the double-headed arrow a. As the rod reciprocates, it forces the solid column of paraffin against the blocks, thereby breaking it. The vertical separation of the blocks and the speed of reciprocation can be adjusted to regulate the length of the resulting elongated granules of paraffin.

Depending on the particular material being granulated, a breaking means may not be necessary. For example, in the case of paraffin, the unified stream coils in the basin 19, if a breaking means is not used. This coiled material can be put directly in a sales envelope. It shatters into short, needle-like pieces while it is beinng stuffed in.

In the example of FIG. 1, the water is collected in a basin 19. The upper level of the water is shown by line 20. Depending on the relative specific gravities of the meltable material and the freezant, the elongated granules will tend to sink or float in the basin. Following breaking, the granules are separated from the freezant by any conventional means. The particular means shown in FIG. 1 is a continuous belt 21 moving around guides 22. The belt has transverse bars 23. These bars scoop the granules from the freezant surface or form the depths of the basin. As the belt leaves the freezant collected in the basin, excess freezant drains back into the basin. Sieve holes in the belt and bars improve the draining. Finally, the granules are dumped into a stock pile.

In the examples of FIG. 1, the freezant is recirculated from the basin back to the pipe 13, via any conventional cooling means.

FIG. 1 shows a drying means to dry the water from the paraffin granules, before they reach the stock pile. This drying means can be any conventional means, such as a stream of dry air blowing across the path of the falling granules.

FIG.1 shows a melting means for the meltable material.

Also shown in FIG. 1 are merging control means to assure that the freezant and molten material streams merge properly into one stream. For example, these control means can adjust the space between the two pipes, so that the streams merge approximately tangentially; or, the control means can control the pressures on the two streams as they leave the pipes, so that they merge approximately tangentially.

In FIG. 2, a modified example of the invention is shown. Here, pipe 14 conducts a stream 10 of molten paraffin into the center of a stream 11 of freezant. The stream of freezant 11 leaves the orifice 25 of the pipe 13 at the same location that the molten paraffin 10 leaves the orifice 26 of the pipe 14. The streams continue straight downwards as one united stream 12. First and second velocity control means are provided to assure that the velocity of the stream of molten material and the velocity of the stream of freezant are equal as the streams leave their respective orifices. These means can be any conventional means capable of obtaining the desired equal velocities. The means illustrated in FIG. 2 are pressure regulators to assure that both streams are under the same head when leaving their respective orifices.

According to one preferred embodiment of the invention, the figures are to scale.

In a successful execution of this invention, resulting paraffin granules have a diameter of 0.3 to 1 mm. and a length of 5 to 10 mm. Water flow rate is 1000 cc./minute and paraffin flow rate is 100 cc./minute. Water temperature is 15° C. and paraffin temperature is 80° C. The paraffin flows through a pipe having an inner diameter of between 1 annd 2 mm., while the water pipe inner diameter is between 3 and 6 mm. The length of the unified stream is between 20 and 30 cm.

Chocolate granules are made with all the above parameters, except that the temperature of the chocolate is 50° C., while the water temperature is 0° C.

It is within the scope of the invention to use valves as parts of the merging control means of FIG. 1 and as parts of the velocity control means of FIG. 2.

The process of the invention is especially well suited for the granulation of a material such as paraffin when using water as a freezant. Even though paraffin tends to float in water, a uniform, elongated granule can be obtained by the method of the invention, because the streams fall at equal speeds, regardless of their specific gravities. The stream of molten paraffin is therefore able to retain its shape until solidified by the colder stream of water.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention set forth in the appended claims.

I claim:
1. A method for granulating meltable material, comprising the steps of: producing a first stream of substantially vertically freely falling molten material; producing a second stream of substantially vertically freely falling, immiscible, liquid freezant, said streams having equal velocities; merging said first and second streams, thereby solidifying a continuous column of said material; and breaking the resulting solid column of meltable material into granules.

2. A method as claimed in claim 1, said streams falling freely under the influence of gravitational acceleration, the temperature of said molten material relative to said freezant being at about 80° C. to 15° C., the initial points of gravitational fallings of said molten material and said freezant being at the same elevation.

3. A method as claimed in claim 1, further including the step of separating the granules from the liquid freezant.

4. A method as claimed in claim 1, said streams falling freely under the influence of the gravitational acceleration.

References Cited

UNITED STATES PATENTS

| | | | |
|---|---|---|---|
| 2,510,135 | 6/1950 | Pedlow et al. | 264—180 |
| 2,627,084 | 2/1953 | Ryan | 18—8 |
| 271,080 | 1/1883 | Kelk | 264—5 X |
| 2,939,177 | 6/1960 | Guentert et al. | 264—143 |
| 3,042,970 | 7/1962 | Terenzi | 264—14 X |
| 3,092,553 | 6/1963 | Fisher et al. | 264—14 X |
| 3,270,106 | 8/1966 | Germerdonk et al. | 264—143 |

ROBERT A. O'LEARY, *Primary Examiner.*

W. E. WAYNER, *Assistant Examiner.*